(No Model.)

F. H. WHEAT.
SUPPORT FOR SPINNING SPINDLES.

No. 401,988. Patented Apr. 23, 1889.

Witnesses:
Edgar A. Goddin
[signature]

Inventor:
Franklin H. Wheat,
by Crosby & Gregory
Attys

United States Patent Office.

FRANKLIN H. WHEAT, OF LOWELL, ASSIGNOR TO GEORGE DRAPER & SONS, OF HOPEDALE, MASSACHUSETTS.

SUPPORT FOR SPINNING-SPINDLES.

SPECIFICATION forming part of Letters Patent No. 401,988, dated April 23, 1889.

Application filed February 14, 1889. Serial No. 299,865. (No model.)

*To all whom it may concern:*

Be it known that I, FRANKLIN H. WHEAT, of Lowell, county of Middlesex, State of Massachusetts, have invented an Improvement in Supports for Spinning-Spindles, of which the following description, in connection with the accompanying drawings, is a specification, like letters on the drawings representing like parts.

This invention has for its object to provide the oil-feeder of a spindle support or bearing with a cap or cover which shall be secured thereto in such manner as to prevent the same becoming detached and lost.

As now commonly practiced, spindle-supports, especially of the class shown in United States Patent No. 344,304, and earlier patents, have an upturned projection or extension which receives oil and constitutes a feeder for the chamber in which stand the bolster bearing and step. This feeder is commonly closed at its upper open end by a cap, which is either placed thereon loosely and held by friction, or else, as has been done in some instances, a screw-cap has been applied to the end of the feeder. When the cap is held in position by friction alone, it soon becomes quite loose, and the operator when brushing the frame frequently knocks off caps and they roll away and are not thereafter hunted up, and as a result thereof the end of the feeder is left open or exposed for the entrance of dirt, flyings, &c. When a screw-cap is used, the trouble of taking it off and putting it back again results in a considerable loss of time, and because of this difficulty the operator is apt to neglect oiling the spindle.

In accordance with the invention herein contained the cap is connected loosely with the feeder and so as to be free to slide thereon for a limited distance, the escape of the cap from the feeder being prevented by a pin or projection on one entering a slot or space of the other. The cap has an oil-hole, which, when the cap is in its normal position, covers the oil-receiving opening of the feeder; but by inserting the snout of an oil-can into said opening of the cap the latter may be lifted to enable the snout of the oil-can to be further inserted into the cap, so that the oil may be discharged into the feeder in desired quantity.

My invention consists, essentially, in the combination, with the feeder of a bolster support or bearing, of a slide-cap having an oil-hole, and a pin and slot to connect the said cap and snout loosely, as will be described.

Figure 1:
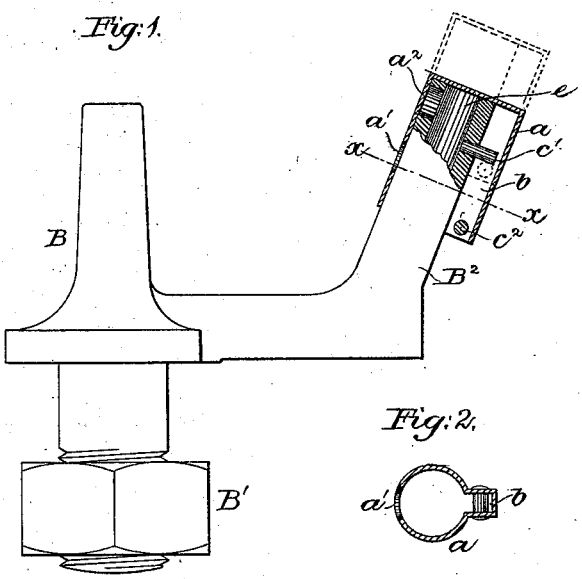
Figure 2:
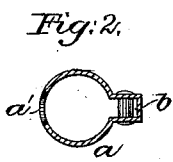

Figure 1 in side elevation, with the cap and feeder partially broken out, represents a supporting-case for a spindle-bearing embracing my invention. Fig. 2 is a section of Fig. 1 in the line $x$, and Fig. 3 shows a modified form of cap.

The supporting-case B, of usual construction and having at its lower end the nut B', by which to attach the case to the rail, and the feeder $B^2$, extended from the support and directed upwardly to receive oil, is and may be of usual construction. This feeder is open at or near its upper end for the introduction of an oil-can into the same.

Referring to Fig. 1, the feeder is surrounded by a cap, $a$, having an oil-hole, $a'$, which is located at some distance from the upper end of the cap, so that when the cap is in normal position it will cover the side opening, $a^2$, in the feeder. The cap shown in Fig. 1 is made by bending a piece of metal or otherwise shaping it so that a slot, as $b$, is left at one side of it, in which slot enters a pin or projection, $c'$, extended from the feeder, a pin or projection, $c^2$, put into the cap after the latter has been applied to the feeder, preventing the cap from being lifted entirely from the feeder.

Figure 3:
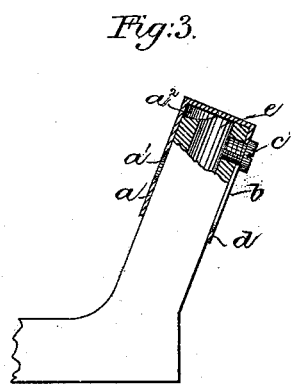

Referring to Fig. 3, the cap is shown as having a long slot, as $b$, through which is extended a projection, $c'$, (shown as a headed screw,) the part of the cap marked $d$ at the end of the slot $c$ preventing the complete removal of the cap.

When it is desired to oil the spindle, the operator will usually place the snout of the usual oil-can in the opening $a'$ and will lift the cap, or the cap may be engaged by hand and be lifted until the opening $a'$ comes opposite the opening $a^2$, when the snout of the oil-can may be pushed in far enough to deliver the oil into the chamber $e$.

I do not desire to limit my invention to the exact shape of the cap, nor to the exact location of the pin and slot whereby the cap is retained in position upon the feeder, yet permitted to rise and fall to a limited extent sufficiently to enable oil to be introduced, when desired, without removing the cap.

I claim—

The combination, with the feeder of a bolster support or bearing, of a sliding cap having an oil-hole, and a pin-and-slot connection to connect the said cap and feeder loosely, as and for the purposes described.

In testimony whereof I have signed my name to this specification in the presence of two subscribing witnesses.

FRANKLIN H. WHEAT.

Witnesses:
JOHN MANEN,
THOMAS F. PRATT.